US010150510B2

(12) United States Patent
Baluch

(10) Patent No.: US 10,150,510 B2
(45) Date of Patent: Dec. 11, 2018

(54) VEHICLE VIBRATION DAMPENING MOUNT ASSEMBLY

(71) Applicant: Nissan North America, Inc., Franklin, TN (US)

(72) Inventor: Stephen Baluch, Farmington Hills, MI (US)

(73) Assignee: Nissan North America, Inc., Franklin, TN (US)

(*) Notice: Subject to any disclaimer, the term of this patent is extended or adjusted under 35 U.S.C. 154(b) by 93 days.

(21) Appl. No.: 15/365,740

(22) Filed: Nov. 30, 2016

(65) Prior Publication Data

US 2018/0148104 A1 May 31, 2018

(51) Int. Cl.
B60K 5/12 (2006.01)
B62D 24/04 (2006.01)
B62D 33/06 (2006.01)

(52) U.S. Cl.
CPC ............ B62D 24/04 (2013.01); B60K 5/1208 (2013.01); B62D 33/0608 (2013.01)

(58) Field of Classification Search
CPC ... B62D 24/04; B62D 33/0608; B60K 5/1208
USPC ............... 296/190.01, 190.07, 35.1
See application file for complete search history.

(56) References Cited

U.S. PATENT DOCUMENTS

| 4,832,319 | A | * | 5/1989 | Noguchi | F16F 13/24 267/140.13 |
|---|---|---|---|---|---|
| 4,936,556 | A | * | 6/1990 | Makibayashi | F16F 13/16 267/140.13 |
| 6,406,010 | B1 | * | 6/2002 | Yano | F16F 13/106 267/140.13 |
| 6,921,067 | B2 | | 7/2005 | Gries et al. | |
| 8,091,871 | B2 | * | 1/2012 | Bradshaw | F16F 13/16 267/140.13 |
| 8,100,388 | B2 | | 1/2012 | Lee et al. | |
| 2005/0001365 | A1 | * | 1/2005 | Kon | F16F 13/264 267/140.14 |
| 2006/0001204 | A1 | * | 1/2006 | Kato | F16F 13/106 267/140.14 |
| 2007/0044654 | A1 | * | 3/2007 | Schedgick | B60G 13/14 92/146 |
| 2007/0045069 | A1 | * | 3/2007 | Schedgick | B60G 99/002 188/378 |

* cited by examiner

Primary Examiner — Jason S Morrow
Assistant Examiner — E Turner Hicks
(74) Attorney, Agent, or Firm — Global IP Counselors, LLP

(57) ABSTRACT

A vehicle vibration dampening mount assembly includes a housing, a resilient material, a sleeve and a solenoid. The resilient material has an outer portion attached to an interior surface of the housing and defines first and second chambers with a fluid passage extending therebetween. The sleeve is disposed within the housing and is attached to a central portion of the resilient material extending from a first end to a second end of the housing. The solenoid has a fixed portion mounted to the first end of the housing and a movable portion fixedly attached to the sleeve for movement therewith. The fixed portion has an electromagnetic coil arranged concentrically around the movable portion. The solenoid is configured to selectively move the moveable portion, the sleeve and the central portion of the resilient material in response to electrical current being provided to the electromagnetic coil.

16 Claims, 8 Drawing Sheets

VEHICLE VIBRATION DAMPENING MOUNT ASSEMBLY

BACKGROUND

Field of the Invention

The present invention generally relates to a vehicle vibration dampening mount assembly. More specifically, the present invention relates to a vehicle vibration dampening mount assembly that includes hydraulic chambers that dampen vibration and an electric solenoid operated to further dampen vibration.

Background Information

Motorized vehicles experience vibrations as they operate and include mount structures that are designed to absorb at least some of the vibration. Some mount structures include an elastic member that makes use of resilient properties of an elastic material to absorb some vibrations. Other mount structures include hydraulic fluid passing between two hydraulic chambers to dampen vibrations.

SUMMARY

One object of the present disclosure is to provide a vehicle with a mount structure that includes a resilient material that absorbs vibration, a hydraulic structure that dampens vibration and an electric solenoid that counteracts and cancels certain vibrations.

In view of the state of the known technology, one aspect of the present disclosure is to provide a vibration dampening mount assembly with a housing, a resilient material, a sleeve and a solenoid. The housing has interior surface, a first end and a second end. The resilient material has an outer portion fixedly attached to the interior surface of the housing. The resilient materials also defines a first chamber and a second chamber with a passage extending from the first chamber to the second chamber the passage. The passage provides fluid communication between the first chamber and the second chamber. The sleeve is disposed within the housing and is fixedly attached to a central portion of the resilient material. The sleeve extends from proximate the first end to the second end of the housing. The solenoid has a fixed portion mounted to the first end of the housing and a movable portion fixedly attached to the sleeve for movement therewith. The fixed portion has an electromagnetic coil arranged concentrically around the movable portion. The solenoid is configured to selectively move the moveable portion, the sleeve and the central portion of the resilient material in response to electrical current being provided to the electromagnetic coil.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
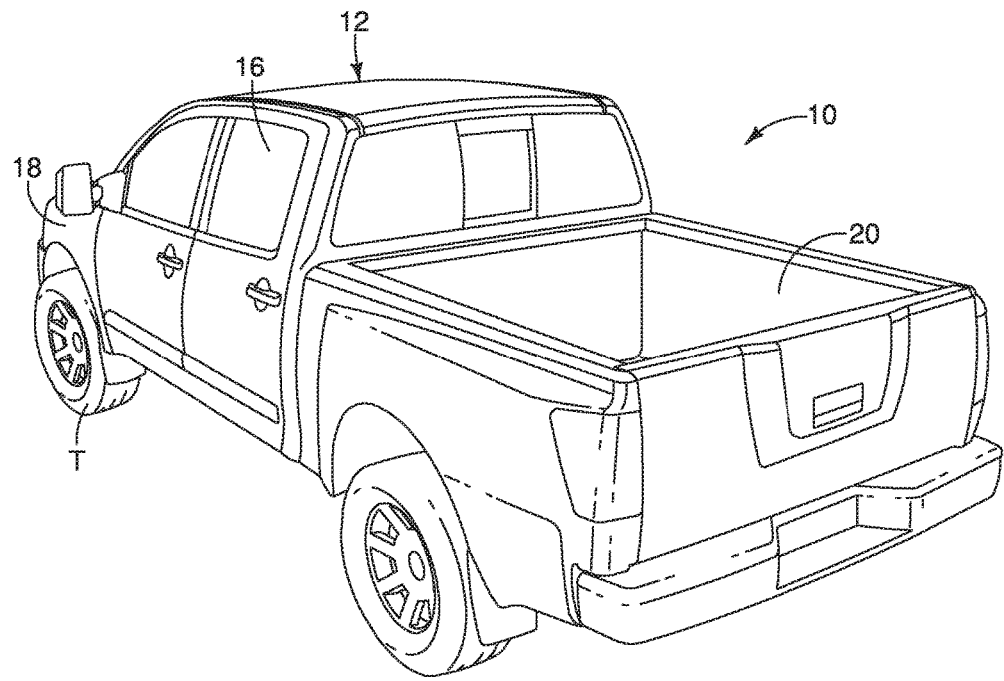
FIG. 1 is a perspective view of a vehicle having a vehicle body structure and a frame in accordance with a first embodiment.

Referring initially to FIG. 1, a vehicle 10 is illustrated in accordance with a first embodiment. The vehicle 10 includes a vehicle body structure 12 and a frame 14 (shown removed from the vehicle 10 in FIG. 2). The vehicle body structure 12 defines a passenger compartment 16, an engine compartment 18 and a cargo area 20. The vehicle body structure 12 is attached to the frame 14 via a plurality of vibration dampening mount assemblies 22 as shown in FIG. 3 and described in greater detail below.

In FIG. 1, the vehicle 10 is depicted as a pickup truck. However, the vibration dampening mount assemblies 22 can be used in any type of vehicle where the construction and design thereof includes a frame that attaches to and supports a body structure. Further, the vibration dampening mount assemblies 22 can be used in a vehicle between a unibody body structure and a corresponding sub-frame or engine cradle of the vehicle. Additionally, the vibration dampening mount assembly 22 can be used in a vehicle between an engine and a corresponding engine cradle or frame of a vehicle to dampen vibrations from an engine.

Figure 2:
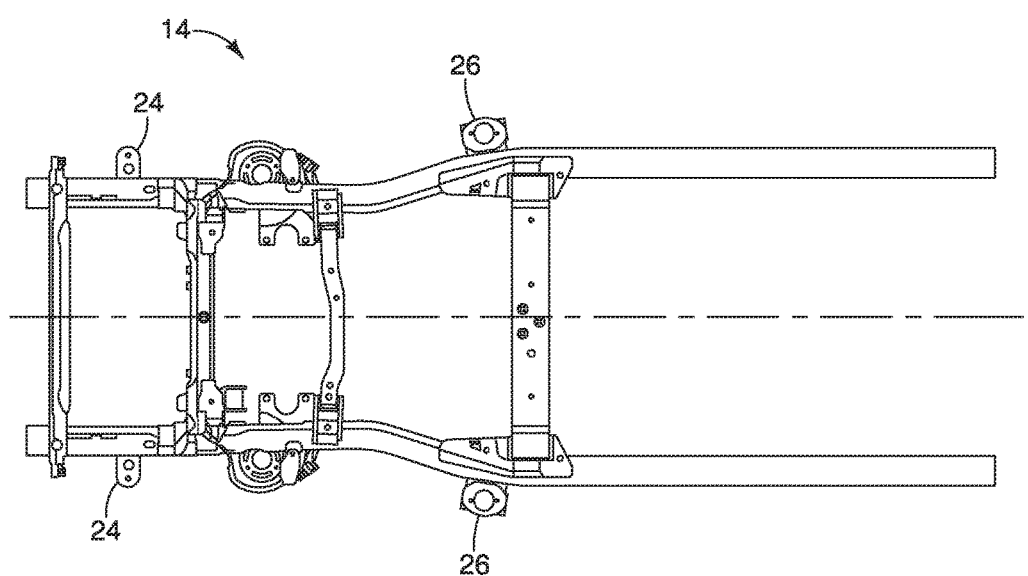
FIG. 2 is a bottom view of the frame shown removed from the vehicle having a plurality of mounting portions in accordance with the first embodiment.

As shown in FIG. 2, the frame 14 includes at least two front mounting portions 24 and at least two mid-body mounting portions 26 that are configured to support the vehicle body structure 12. The frame 4 can include additional mounting portions (not shown) depending upon the design and configuration of the vehicle body structure 12 and the frame 14. The cargo area 20, suspension structures, power plant (motor) are supported to the frame 14 in conventional manners via, for example, additional mounting portions and additional vibration dampening mount assemblies 22. Since vehicle body structure, frames and mounting portions are conventional vehicle components, further description is omitted for the sake of brevity.

Figure 3:
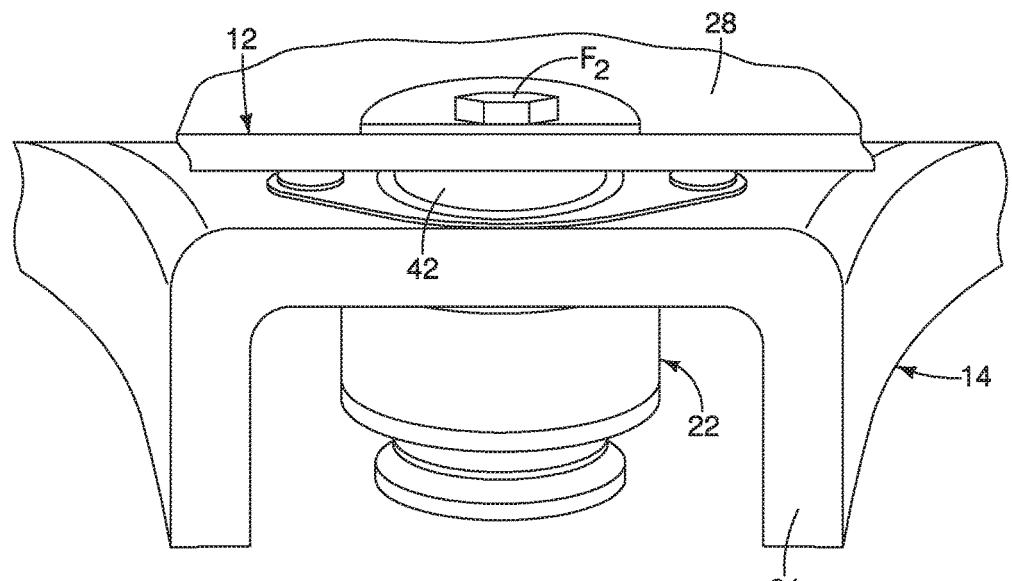
FIG. 3 is a perspective view of one of the plurality of mounting portions of the frame, a corresponding mounting portion of the vehicle body structure with a vibration dampening mounting assembly attached therebetween in accordance with the first embodiment.
Figure 4:
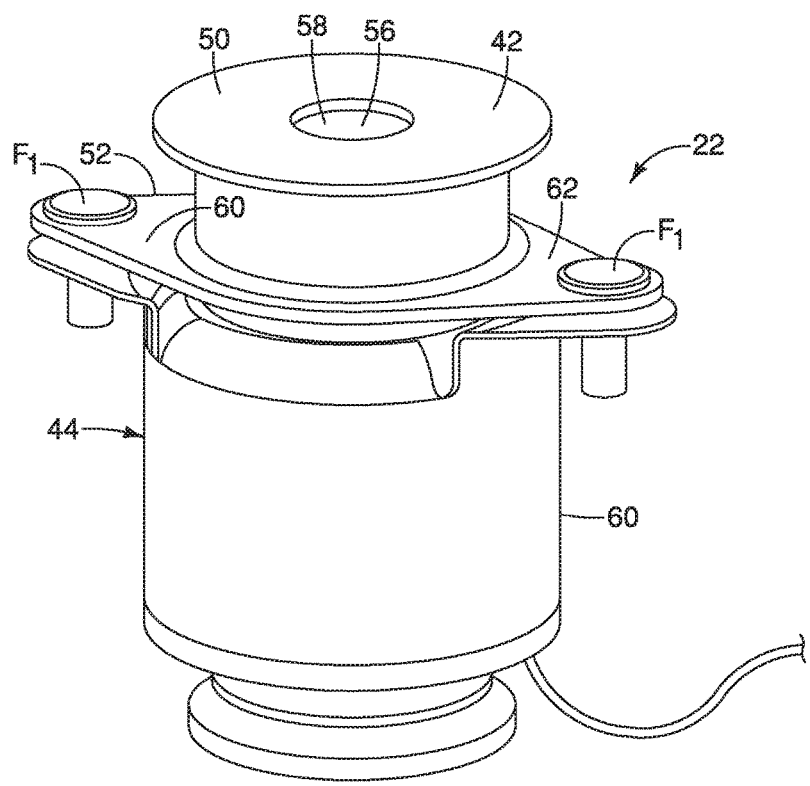
FIG. 4 is a perspective view of the vibration dampening mounting assembly shown removed from the vehicle in accordance with the first embodiment.

As shown in FIG. 3, one of the vibration dampening mount assemblies 22 is mechanically attached to one of the front mounting portions 24 and to a corresponding mounting portion 28 of the vehicle body structure 12. The vibration dampening mount assembly 22 separates the vehicle body structure 12 and the frame 14 and is configured to absorb and dampen vibrations that might otherwise be transmitted from the frame 14 to the vehicle body structure 12 (and vice-versa).

A description of the vibration dampening mount assemblies 22 is now provided with specific reference to FIGS. 4-7. Since each of the vibration dampening mount assemblies 22 are identical to one another, description of one of the vibration dampening mount assemblies 22 below applies equally to each of the vibration dampening mount assemblies 22. The vibration dampening mount assembly 22 is shown removed from the vehicle 10 in FIG. 4-7. The vibration dampening mount assemblies 22 includes a load bearing portion 42, a hydraulic damper portion 44 and a solenoid portion 46.

The vibration dampening mount assembly 22 is fixedly installed to the frame 14 via fasteners $F_1$ in a manner described in greater detail below. The vibration dampening mount assembly 22 is further fixedly installed to the frame 14 via a fastener $F_2$ in a manner that is also described in greater detail below.

Figure 5:
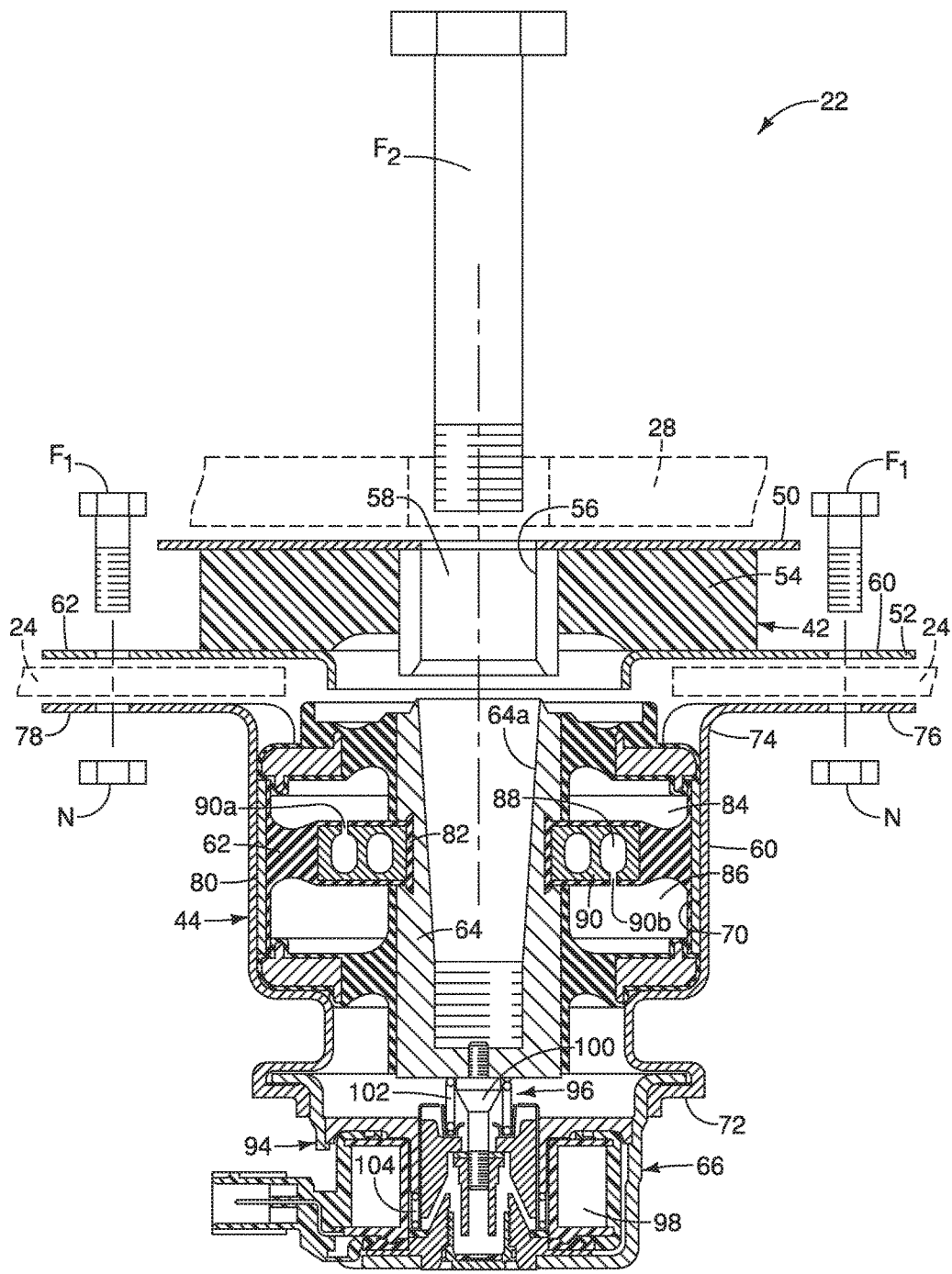
FIG. 5 is a cross-sectional view of the vibration dampening mounting assembly showing details of a load bearing portion, a hydraulic damper portion and a solenoid portion in accordance with the first embodiment.

As shown in FIG. 5, the load bearing portion 42 includes an upper bearing plate 50 spaced from a lower mounting plate 52. The load bearing portion 42 further includes a damping member 54 (sometimes referred to as a main rubber element) such as an elastomeric material or natural rubber, that is secured at opposite ends to the upper mounting plate 50 and the lower mounting plate 52, respectively. The damping member 54 can be mold bonded to the upper and lower mounting plates 50 and 52 in a conventional manner. The load bearing portion 42, including the upper and lower mounting plates 50 and 52, and the dampening member 54, include a first sleeve portion 56 that defines a central aperture 58 dimensioned to receive the fastener $F_2$. The dampening member 54 is also mold bonded to a radially outer surface of the first sleeve portion 56.

The lower mounting plate 52 includes attachment flanges 60 and 62 that extend laterally outward, each of the flanges 60 and 62 including openings that receive the fasteners $F_1$.

The upper and lower mounting plates 50 and 52, and the first sleeve portion 56 are formed from any suitably hard material such as a composite material, aluminum, steel, etc. The dampening member 54 is formed from any suitably performing compliant substance, such as, an elastomer, natural rubber, polymer, etc. The upper mounting plate 50 and the first sleeve portion 56 are preferably formed from separate metal components that are subsequently joined (e.g., welded) together for ease of assembly, although it will be understood that the first sleeve portion 56 and the upper and lower mounting plates 50 and 52 can be formed from the same type of rigid material (for example, metal) or from a rigid composite material. Further, the upper bearing plate 50 and the first sleeve portion 56 can be integrally formed with a homogeneous structural arrangement.

As shown in FIG. 5, the hydraulic damper portion 44 includes a housing 60, a resilient material section 62, a second sleeve portion 64 and a solenoid 66.

The housing 60 is basically a rigid metal element that has an overall cylindrical shaped. The housing 60 further has an interior surface 70, a first end 72 (a lower end), a second end 74 (an upper end) and an attachment flanges 76 and 78. The attachment flanges 76 and 78 includes openings that align with the openings in the flanges 60 and 62 and receive the fasteners $F_1$.

The resilient material section 62 has an outer portion 80 that is fixedly attached to the interior surface 70 of the housing 60. The outer portion 80 is molded to or adhesively fixed to the interior surface 70. The outer portion 80 has an annular or cylindrical shape confirming to the cylindrical shape of the housing 60. The resilient material section 62 has an inner portion 82 that is fixed to a radially outer surface of the second sleeve portion 64. The resilient material section 62 further defines a first chamber 84 and a second chamber 86 with a passage 88 extending from the first chamber 84 to the second chamber 86. The first chamber 84 and the second chamber 86 are annular shaped chambers that are concentrically extend around the second sleeve portion 64. The passage 88, the first chamber 84 and the second chamber 86 are filled with hydraulic fluid. Further, the passage 88 is in fluid communication with the first chamber 84 and the second chamber 86.

The resilient material section 62 can be a single molded element, or can be assembled from a plurality of separate members, adhered together to form the depicted resilient material section 62. As shown in FIG. 5, the resilient material section 62 can includes a restrictor 90 that defines the passage 88. The restrictor 90 is formed such that the passage 88 is an elongated, preferably serpentine interconnecting passage that is open at one end 90a to the first chamber 84, and open another end 90b to the second chamber 86. In response to vibrations experienced by the vibration dampening mount assembly 22, fluid flows between the first chamber 84 and the second chamber 86 via the passage 88. However, due to the shape and dimensions of the passage 88, fluid flow is restricted there by aiding in the dampening of vibrations.

Alternatively, the restrictor 90 can be eliminate and the passage 88 be defined by an opening or openings in the resilient material section 62 between the first chamber 84 and the second chamber 86.

The second sleeve portion 64 is disposed within the housing 60 and is fixedly attached to a central portion of the resilient material 62. The first chamber 84, the second chamber 86 and the restrictor 90 are concentric about the second sleeve portion 64. The second sleeve portion 64 extends from proximate the first end 72 (lower end) of the housing 60 to the second end 74 (upper end) of the housing 60. The second sleeve portion 64 defines a central aperture 64a that is open at the second end 74 (upper end) of the housing 60 and extends from the second end 74 to proximate the first end 72 of the housing. A lower end of the central aperture 64a is closed and is provided with threads that engage and retain the fastener $F_2$.

The solenoid 66 includes a fixed portion 94 and a movable portion 96. The fixed portion 94 is mounted to or fixedly attached to the first end 72 of the housing 60. The movable portion 96 is fixedly attached to the second sleeve portion 64 for movement therewith. The fixed portion 94 includes an electromagnetic coil 98 arranged concentrically around the movable portion 96. The solenoid 66 is configured to selectively move the moveable portion 96, the second sleeve portion 64 and the central portion of the resilient material 62 in response to electrical current being provided to the electromagnetic coil 98. The moveable portion 96 includes a metallic shaft member 100 that is fixed to the lower end of the second sleeve portion 64. The metallic shaft member 100 is made of a material that responds to the generation of magnetic fields. Specifically, when the electromagnetic coil 98 is provided with electric current, the resulting magnetic field generated by the electromagnetic coil 98 causes the metallic shaft member 100 to move vertically relative to the depiction in FIG. 5. The movable portion 96 can also include springs 102 and 104 that return the metallic shaft member 100 and the second sleeve portion 64 to the orientation shown in FIG. 5.

When the vibration dampening mount assembly 22 is installed to the vehicle 10, the housing 60 is positioned beneath the front mounting portion 24 and the load bearing portion 42 is positioned above the front mounting portion 24, as shown in FIG. 3. The fasteners $F_1$ are inserted into the openings in the flanges 60 and 62, further pass through apertures in the front mounting portion 24 (not shown) and then into the openings in the flanges 76 and 78. Lower fastening nuts N are threaded on to the fasteners F1 and tightened, securing the housing and the load bearing portion 42 to the frame 14.

Next, the vehicle body structure 12 is lowered on to the frame 14 such that an opening in the mounting portion 28 of the vehicle body structure 2 aligns with the central aperture 58 of the load bearing portion 42. The fastener $F_2$ is then inserted into the opening in the mounting portion 28, and further through the central aperture 58 and the central aperture 64a of the second sleeve portion 64. The fastener F2 is then tightened and secured to the threads at the lower end of the second sleeve portion 64.

Figure 6:
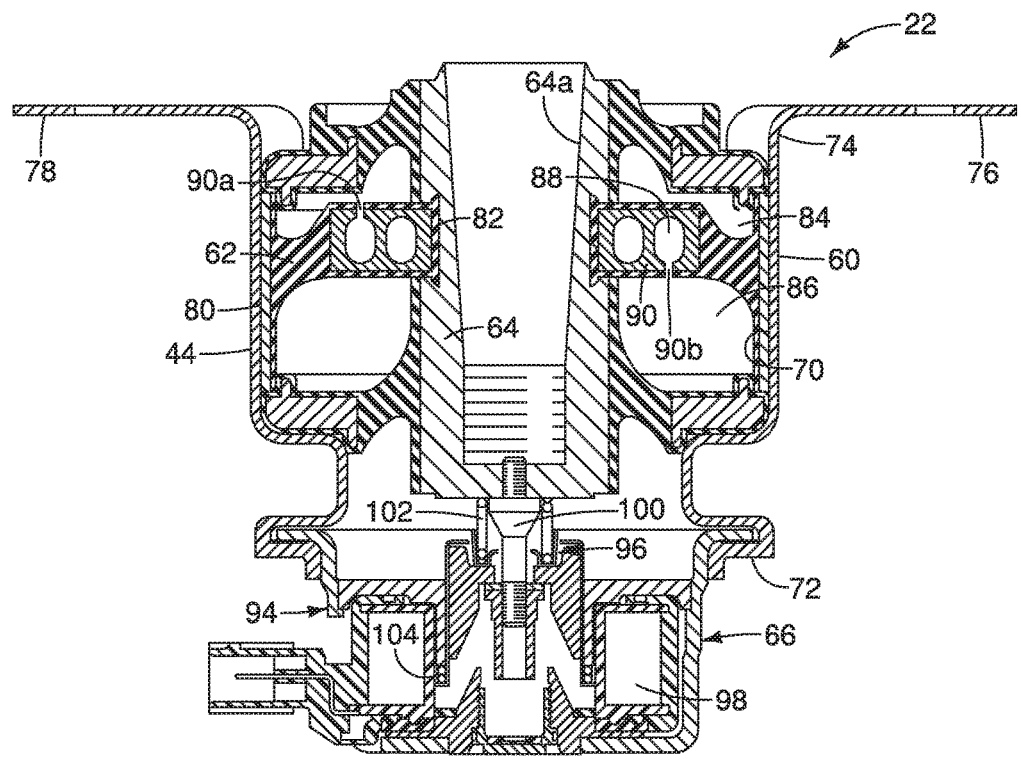
FIG. 6 is another cross-sectional view of the vibration dampening mounting assembly similar to FIG. 5, showing upward displacement of central portions of the vibration dampening mounting assembly in accordance with the first embodiment.
Figure 7:
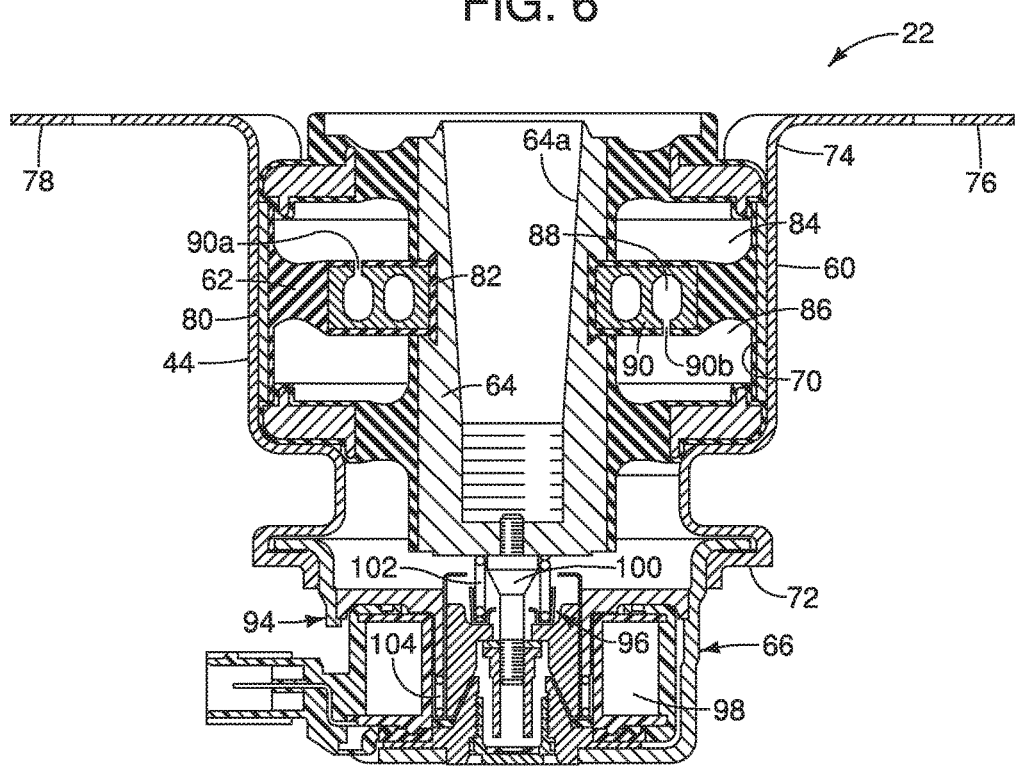
FIG. 7 is yet another cross-sectional view of the vibration dampening mounting assembly similar to FIGS. 5 and 6, showing downward displacement of central portions of the vibration dampening mounting assembly in accordance with the first embodiment.

When there is relative vibration between the frame 14 and the vehicle body structure 12, the vibration dampening mount assembly 22 cushions, absorbs and dampens the vibrations as a result of the following features of the vibration dampening mount assembly 22. First, the dampening member 54 of the load bearing portion 56 and the resilient material 62 within the housing 60 absorbs and cushions vibrations. Second, movement of the hydraulic fluid between the first and second chambers 84 and 86 dampen vibrations. The dampening and vibration absorbing effects of the dampening member 54 and the resilient material 62 are depicted in FIGS. 6 and 7, where relative movement between the second sleeve portion 64 and the housing 60 is demonstrated. During such movement, the volume of each of the first chamber 84 and the second chamber 86, one increasing and the other decreasing, forcing the hydraulic fluid to move through the passage 88 between the two chambers. Finally, operation of the solenoid 66 further dampens vibrations in a manner described further below. Specifically, when the solenoid 66 is operated, the electromagnetic coil 98 is provided with current which causes the shaft member 100, the second sleeve portion 64 and the fastener $F_2$ to move in a manner that either cancels a portion of the vibration or compensates for it to eliminate the vibration as quickly as possible.

Figure 8:
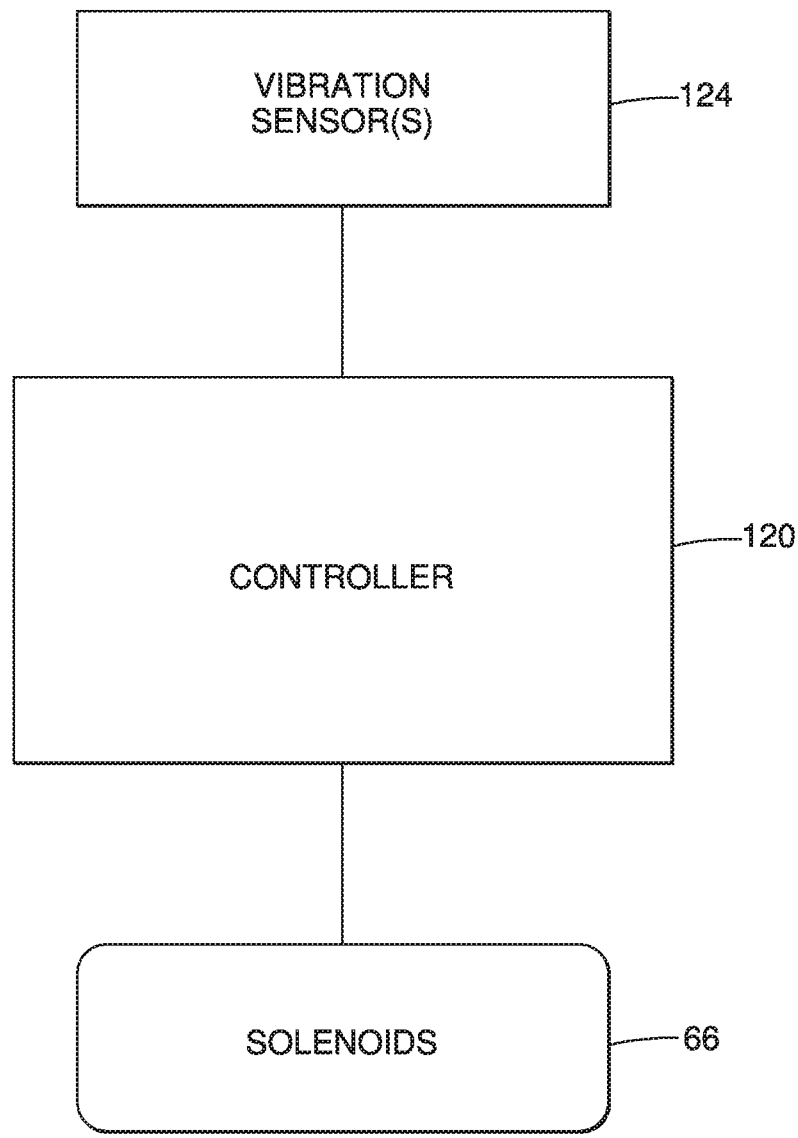
FIG. 8 is a block diagram showing a controller, sensor(s) and solenoid(s) of the vibration dampening mounting assemblies in accordance with the first embodiment.

As shown in FIG. 8, the vehicle 10 further includes a controller 120 electrically connected to the solenoid 66 of each of the vibration dampening mount assemblies 22 and a plurality of sensors 124 that are connected to the controller 120. The sensors 124 can be installed at various locations about the vehicle 10, depending upon the inherent vibration propagating characteristics of the overall design of the vehicle 10. In the case of a pickup truck, such as that depicted in FIG. 1, the sensors 124 can be installed adjacent to each of the mounting portions 24 and 26 of the frame 14 or on adjacent portions of the vehicle body structure 12. The sensors 124 can be, for example, accelerometers that detect changes in velocity and/or acceleration. The sensors 124 provide signals to the controller 120 indicating vibration(s). In response to signals from the sensors 124, the controller 120 sends current to one or more of the solenoids 66 on corresponding ones of the vibration dampening mount assemblies 22 to counter or cancel out the detected vibrations in much the same way as noise cancelling head phones cancel out ambient noise.

The vibration dampening mount assemblies 22 can be fine-tuned to fit the vibration dampening needs of the vehicle 10 by changing the thickness and/or elastic characteristics of resilient material 62 and/or the fluid flow characteristics of the passage 88. Further, the strength of the magnetic field generated by the solenoids 66 can be controlled by the controller 120 in order to provide an appropriate vibration canceling/dampening movement of the movable portion 96 (and the second sleeve portion 64) to the vibration dampening mount assemblies 22. Consequently, the solenoid 66 is configured to selectively move the moveable portion 96, the second sleeve portion 64 and the central portion of the resilient material 62 in response to detection of vibrations between the frame 14 (a first portion of the vehicle 10) and the vehicle body structure 12 (a second portion of the vehicle 10).

Second Embodiment

Figure 9:
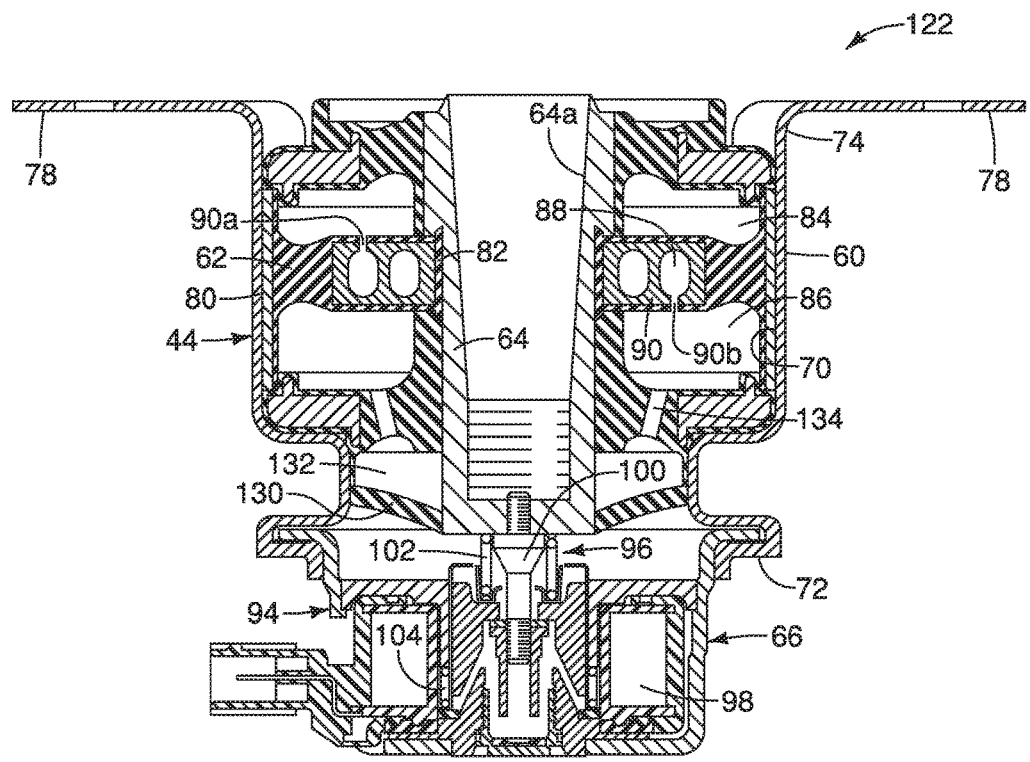
FIG. 9 is a cross-sectional view of a portion of a vibration dampening mounting assembly in accordance with a second embodiment.

Referring now to FIG. 9, a portion of a vibration dampening mount assembly 122 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The vibration dampening mount assembly 122 includes many of the features of the vibration dampening mount assembly 22 of the first embodiment. For example, the vibration dampening mount assembly 122 includes the housing 60, the resilient material 62, the restrictor 90 (with passage 88) and the second sleeve portion 64. The vibration dampening mount assembly 122 also includes the solenoid 66 as described above with respect to the first embodiment.

The vibration dampening mount assembly 122 also includes a lower resilient material 130 that is fixed at a radially inner area to a lower end of the second sleeve portion 64, and at a radially outer area to a lower portion of the housing 60. A third chamber 132 is defined above the lower resilient material 130 and below the resilient material 62. The third chamber 132 is annular in shape and is filled with hydraulic fluid. A second passage 134 is defined between the second chamber 86 and the third chamber 132 providing restricted fluid communication therebetween. The fluid flow rates through the passage 88 and the passage 132 can be adjusted providing another means for adjusting and fine tuning the vibration dampening characteristics of the vibration dampening mount assembly 122 along with operation of the solenoid 66 for vibration dampening.

Third Embodiment

Figure 10:
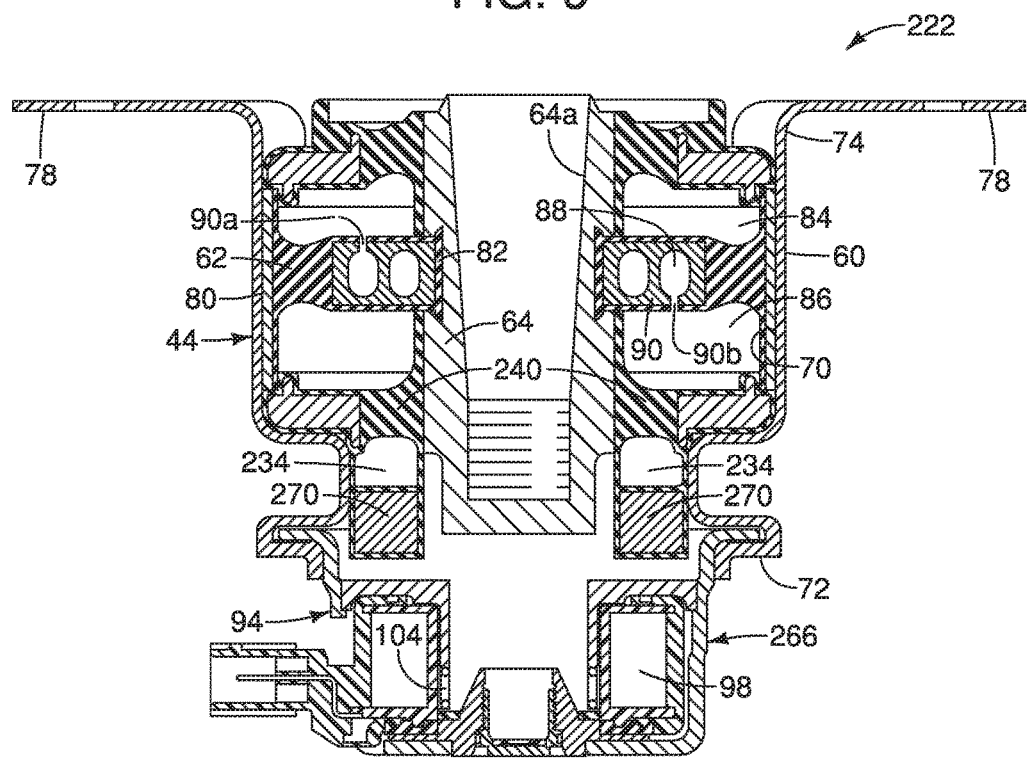
FIG. 10 is a cross-sectional view of a portion of a vibration dampening mounting assembly in accordance with a third embodiment.

Referring now to FIG. 10, a portion of a vibration dampening mount assembly 222 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The vibration dampening mount assembly 222 includes many of the features of the vibration dampening mount assembly 22 of the first embodiment. For example, the vibration dampening mount assembly 222 includes the housing 60, the resilient material 62, the restrictor 90 (with passage 88) and the second sleeve portion 64. The vibration dampening mount assembly 222 also includes a solenoid 266.

The solenoid 266 includes the electromagnetic coil 98 as described above in the first embodiment. The solenoid 266 also includes a movable portion 270 that is imbedded within a second resilient material 240. The second resilient material 240 is fixed at a radially inner area to a lower end of the second sleeve portion 64, and at a radially outer area to a lower portion of the housing 60. A third chamber 234 is defined within the resilient material 240 and below the resilient material 62. The third chamber 234 is annular in shape and is filled with hydraulic fluid. The third chamber 234 is sealed.

When the solenoid 266 is operated, magnetic fields generated by the electromagnetic coil 98 cause movement of the movable portion 270. Since the third chamber 234 is sealed, movement of the movable portion 270 causes corresponding movement (or application of force) against the resilient material 62 thereby counteracting vibrations.

Fourth Embodiment

Figure 11:
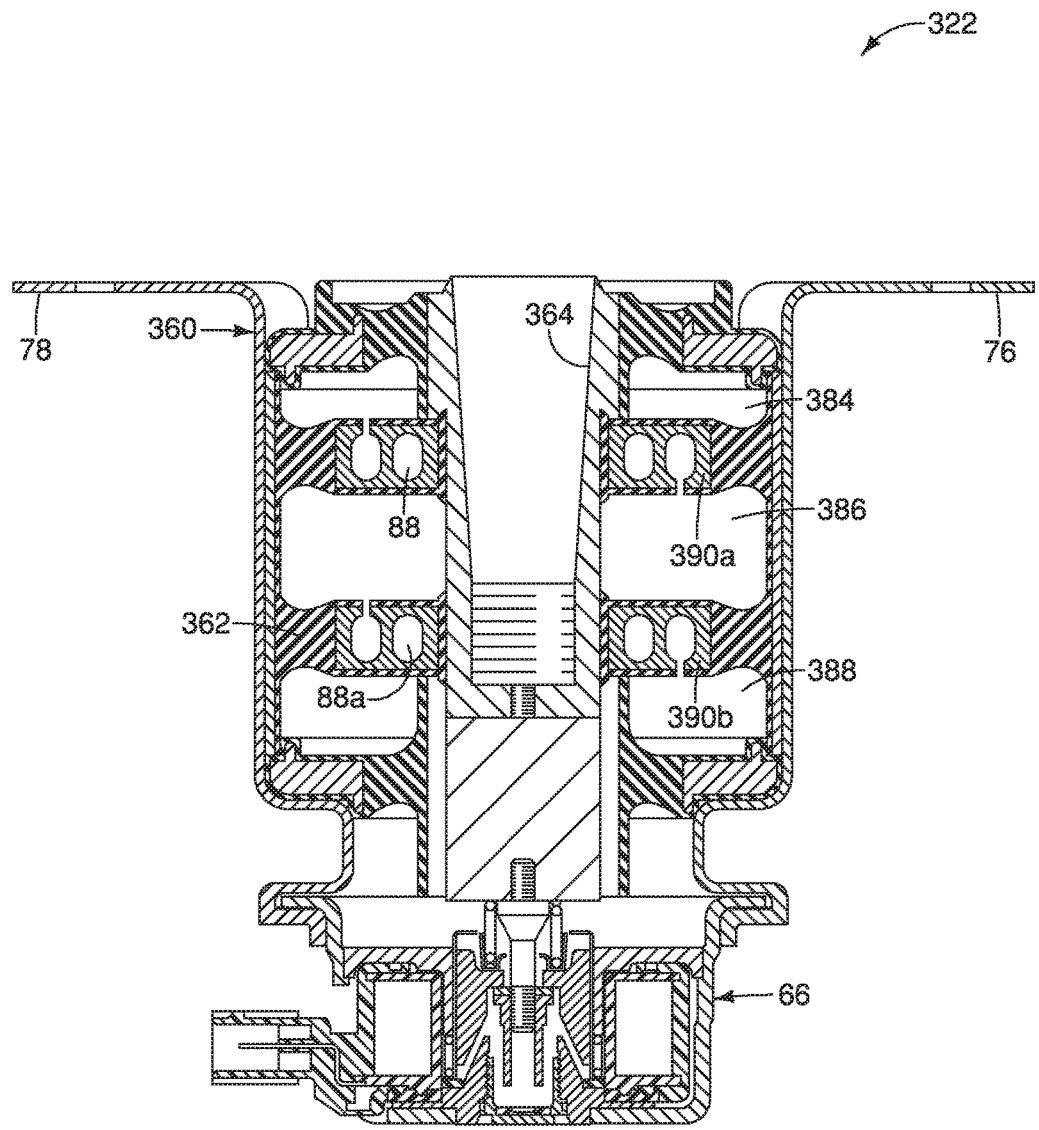
FIG. 11 is a cross-sectional view of a portion of a vibration dampening mounting assembly in accordance with a fourth embodiment.

Referring now to FIG. 11, a portion of a vibration dampening mount assembly 322 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The vibration dampening mount assembly 322 includes a housing 360, a resilient material 362, a first restrictor 390a (with passage 88), a second restrictor 390b, a second sleeve portion 364 and the solenoid 66 as described in the first embodiment.

The housing 360 is slightly taller than the housing 60 of the first embodiment, but otherwise includes each and every feature of the housing 60 described above with respect to the first embodiment. The resilient material 362 defines a first chamber 384, a second chamber 396 and a third chamber 388, all filled with hydraulic fluid. The first restrictor 390a (with passage 88) is disposed between the first chamber 384 and the second chamber 386 and operates in a manner consistent with the restrictor 90 of the first embodiment restricting flow of fluid between the first and second chambers 384 and 386 in order to dampen vibrations. The second restrictor 390b is located between the second chamber 386 and the third chamber 388 and includes a passage 88a. The second restrictor 390b also operates in a manner consistent with the restrictor 90 of the first embodiment restricting flow of fluid between the second and third chambers 386 and 388 in order to dampen vibrations.

The solenoid 66 operates as described above with respect to the first embodiment.

The inclusion of the first, second and third chambers 384, 386 and 388 provides a further structure that can be fine tuned to dampen vibrations more effectively. For example, the first restrictor 390a and the second restrictor 390b can be designed with differing fluid flow rates making it possible to achieve a different set of dampening characteristics as compared to the vibration dampening mount assemblies 22, 122 and 222.

Fifth Embodiment

Figure 12:
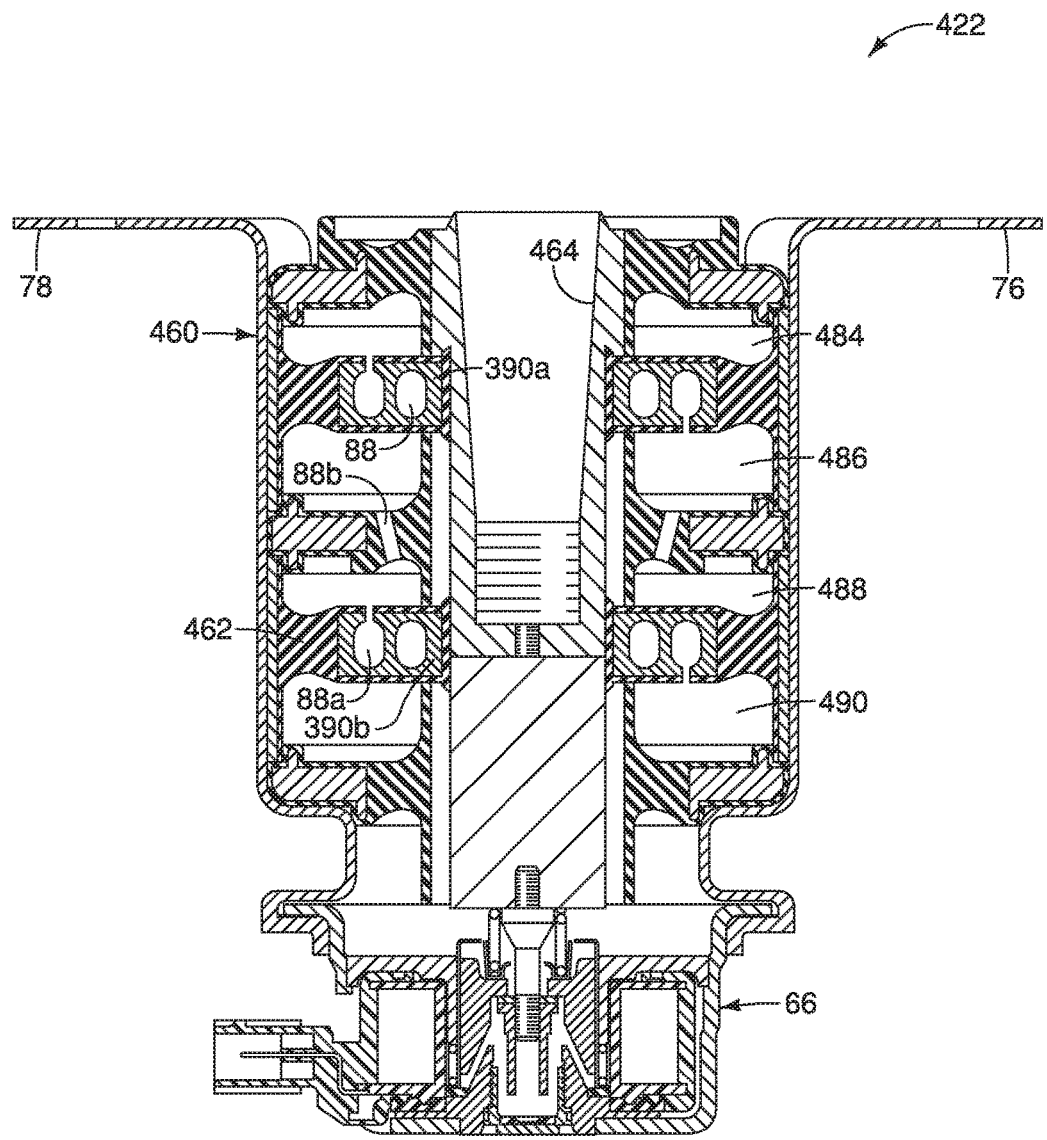
FIG. 12 is a cross-sectional view of a portion of a vibration dampening mounting assembly in accordance with a fifth embodiment.

Referring now to FIG. 12, a portion of a vibration dampening mount assembly 422 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The vibration dampening mount assembly 422 includes a housing 460, a resilient material 462, the first restrictor 390a (with passage 88) from the fourth embodiment, the second restrictor 390b (with passage 88a) from the fourth embodiment, a second sleeve portion 464 and the solenoid 66 as described in the first embodiment.

The housing 460 is slightly taller than the housing 60, but otherwise includes each and every feature of the housing 60 described above with respect to the first embodiment. The resilient material 462 defines a first chamber 484, a second chamber 496, a third chamber 488 and a fourth chamber 490, all filled with hydraulic fluid. The first restrictor 390a (with passage 88) is disposed between the first chamber 484 and the second chamber 486 and operates in a manner consistent with the restrictor 90 of the first embodiment restricting flow of fluid between the first and second chambers 484 and 486 in order to dampen vibrations. The second restrictor 390b is located between the third chamber 488 and the fourth chamber 490. The second restrictor 390b also operates in a manner consistent with the restrictor 90 of the first embodiment restricting flow of fluid between the third and fourth chambers 488 and 490 in order to dampen vibrations. An additional passage 88b is formed in the resilient material 462 and extends between the second chamber 486 and the third chamber 488.

The solenoid 66 operates as described above with respect to the first embodiment.

The inclusion of the first, second, third and fourth chambers 484, 486, 488 and 490 provides a further structure that can be fine-tuned to dampen vibrations more effectively.

The controller 120 preferably includes a microcomputer with a vibration dampening control program that controls the solenoids 66, as discussed below. The controller 120 can also include other conventional components such as an input interface circuit, an output interface circuit, and storage devices such as a ROM (Read Only Memory) device and a RAM (Random Access Memory) device. The microcomputer of the controller 120 is programmed to respond to signals received from the sensors 124 and control the solenoids 66 to dampen vibration. The controller 120 is operatively coupled to the solenoids 66 and the sensors 124 in a conventional manner. The internal RAM of the controller 120 stores statuses of operational flags and various control data. The internal ROM of the controller 120 stores the operational data for various operations. It will be apparent to those skilled in the art from this disclosure that the precise structure and algorithms for the controller 120 can be any combination of hardware and software that will carry out the functions of the present invention.

The various features of the vehicle 10 other than the vibration dampening mount assemblies 22, 122, 222, 322 and 422 are conventional components that are well known in the art. Since these components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vibration dampening mount structure. Accordingly, these terms, as utilized to describe the present invention should be interpreted relative to a vehicle equipped with the vibration dampening mount structure.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vibration dampening mount assembly comprising:
    a housing having interior surface, a first end and a second end;
    a resilient material having an outer portion fixedly attached to the interior surface of the housing and defining a first chamber, a second chamber and a third chamber with a first passage extending from the first chamber to the second chamber the first passage being in fluid communication with the first chamber and the second chamber, the third chamber being a sealed chamber filled with hydraulic fluid;
    a sleeve disposed within the housing and being fixedly attached to a central portion of the resilient material, the sleeve extending from proximate the first end to the second end of the housing, the sleeve defining a central axis; and
    a solenoid having a fixed portion mounted to the first end of the housing and a movable portion fixedly attached to the resilient material adjacent to the third chamber, the movable portion being concentrically arranged around the central axis, the fixed portion having an electromagnetic coil arranged concentrically around the central axis with the movable portion being located between the third chamber and the electromagnetic coil relative to the central axis, the solenoid being configured to selectively move the moveable portion, the sleeve and the central portion of the resilient material in response to electrical current being provided to the electromagnetic coil.

2. The vibration dampening mount assembly of claim 1, further comprising
    a sensor configured to detect vibrations, and
    a controller connected to the sensor and the solenoid, the controller being configured to operate the solenoid in response to the vibrations detected by the sensor.

3. The vibration dampening mount assembly of claim 2, further comprising
    the sensor is an accelerometer.

4. The vibration dampening mount assembly of claim 1, wherein
    the sleeve defines a central aperture that extends from proximate the first end of the housing to the solenoid, with the first chamber, the second chamber and the third chamber being concentric about the central axis defined by the sleeve.

5. The vibration dampening mount assembly of claim 4, wherein
    the central aperture is dimensioned to receive an elongated fastener configured to fix the central portion of the resilient material to a first portion a vehicle, and the housing includes and attachment portion that is configured to attach to a second portion of the vehicle.

6. The vibration dampening mount assembly of claim 5, wherein
the first portion of the vehicle is a frame and the second portion of the vehicle is a cabin structure installed to the frame.

7. The vibration dampening mount assembly of claim 5, further comprising
a sensor installed to one of the first portion and the second portion of the vehicle, the sensor being configured to detect vibrations, and
a controller connected to the sensor and the solenoid, the controller being configured to operate the solenoid in response to the vibrations detected by the sensor.

8. The vibration dampening mount assembly of claim 7, further comprising
the sensor is an accelerometer.

9. The vibration dampening mount assembly of claim 1, wherein
the passageway of the resilient material extends from the first chamber to the second chamber and provides restricted fluid communication between the first and second chambers in order to dampen vibration.

10. A vehicle vibration dampening mount assembly comprising:
a first portion and a second portion of a vehicle structure;
a housing having interior surface, a first end and a second end attached to the first portion of the vehicle structure;
a resilient material having an outer portion fixedly attached to the interior surface of the housing and defining a first chamber, a second chamber and a third chamber with a passage extending from the first chamber to the second chamber the passage being in fluid communication with the first chamber and the second chamber, the third chamber being a sealed chamber filled with hydraulic fluid;
a sleeve disposed within the housing and being fixedly attached to a central portion of the resilient material, the sleeve extending from proximate the first end to the second end of the housing, the sleeve being attached to the second portion of the vehicle, the sleeve defining a central axis;
a solenoid having a fixed portion mounted to the first end of the housing and a movable portion fixedly attached to the resilient material adjacent to the third chamber, the movable portion being concentrically arranged around the central axis, the fixed portion having an electromagnetic coil arranged concentrically around the central axis with the movable portion being located between the third chamber and the electromagnetic coil relative to the central axis, the solenoid being configured to selectively move the moveable portion, the sleeve and the central portion of the resilient material in response to detection of vibrations between the first portion and the second portion of the vehicle structure.

11. The vibration dampening mount assembly of claim 10, further comprising
a sensor installed within the vehicle structure and configured to detect vibrations, and
a controller installed within the vehicle structure and being connected to the sensor and the solenoid, the controller being configured to operate the solenoid in response to the vibrations detected by the sensor.

12. The vibration dampening mount assembly of claim 11, further comprising
the sensor is an accelerometer.

13. The vibration dampening mount assembly of claim 10, wherein
the sleeve defines a central aperture that extends from proximate the first end of the housing to the solenoid, with the first chamber, the second chamber and the third chamber being concentric about a central axis defined by the central aperture.

14. The vibration dampening mount assembly of claim 13, wherein
the central aperture is dimensioned to receive an elongated fastener that fix the central portion of the resilient material, the sleeve and the movable portion of the solenoid to the second portion a vehicle, and
the housing includes and attachment portion that is configured to attach to a second portion of the vehicle.

15. The vibration dampening mount assembly of claim 14, wherein
the first portion of the vehicle structure is a vehicle body frame and the second portion of the vehicle body structure is a cabin structure installed beneath the body structure.

16. The vibration dampening mount assembly of claim 11, wherein
the passageway of the resilient material extends from the first chamber to the second chamber and provides restricted fluid communication between the first and second chambers in order to dampen vibration.

* * * * *